Figure 1:
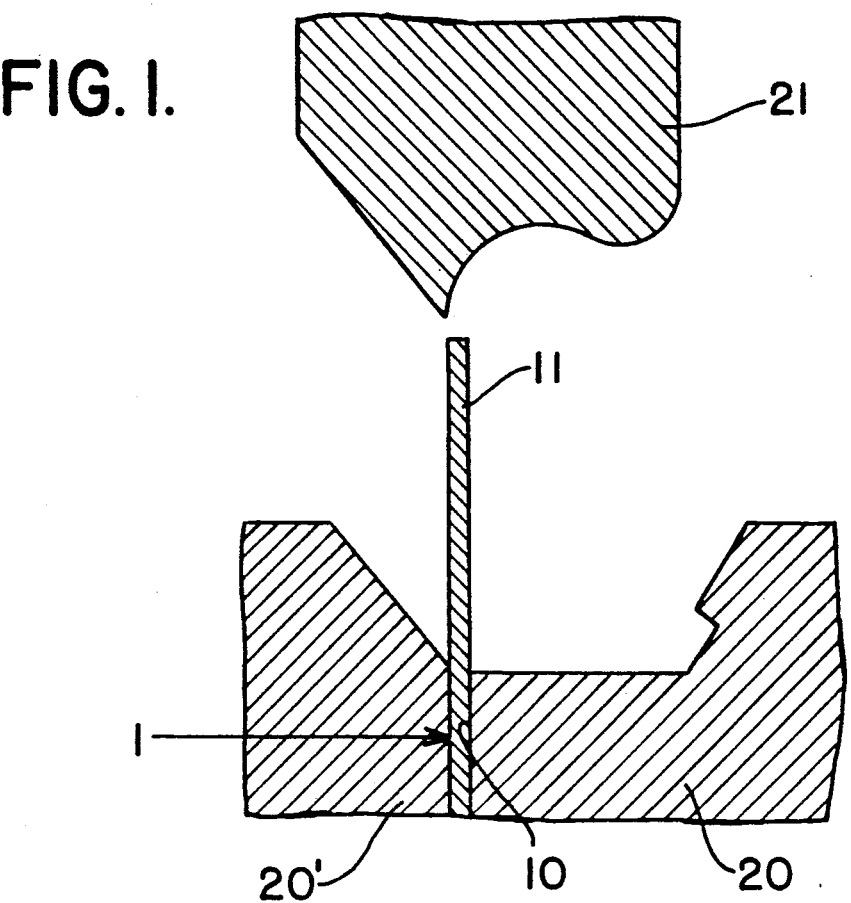

United States Patent [19]

Bichel et al.

[11] Patent Number: 5,072,509

[45] Date of Patent: Dec. 17, 1991

[54] METHOD OF MANUFACTURING A BELT PULLEY

[75] Inventors: Joachim Bichel, Arnsberg; Robert Temmann, Ascheberg, both of Fed. Rep. of Germany

[73] Assignee: Leifeld GmbH & Co., Ahlen/Westf, Fed. Rep. of Germany

[21] Appl. No.: 524,159

[22] Filed: May 16, 1990

[30] Foreign Application Priority Data

May 17, 1989 [EP] European Pat. Off. ...... 89 108 837.9

[51] Int. Cl.⁵ .............................................. B21K 1/42
[52] U.S. Cl. ..................................... 29/892.3; 72/111
[58] Field of Search ............... 29/892, 892.3; 474/168, 474/170, 174; 72/107, 110, 111

[56] References Cited

U.S. PATENT DOCUMENTS

| 4,055,976 | 11/1977 | Kraft | 29/892.3 |
| 4,273,547 | 6/1981 | Bytzek | 29/892.3 |
| 4,631,946 | 12/1986 | Oda | 29/892.3 |

FOREIGN PATENT DOCUMENTS

| 3819957 | 3/1989 | Fed. Rep. of Germany | 29/892 |
| 28036 | 2/1987 | Japan | 29/892.3 |

Primary Examiner—P. W. Echols
Attorney, Agent, or Firm—Felfe & Lynch

[57] ABSTRACT

Method of manufacturing a belt pulley from a metal disk, e.g. a multiple-V-belt pulley, toothed belt pulley, flat belt pulley, etc., having a hub and an area that is provided with a profile which is basically hollow cylindrical and has a smooth or crowned outside. In a first operational step the metal disk is given a wave-like profile in its circumferential area and in following operational steps the respective final profile is completed. Known methods require numerous operational steps and a great force input to carry out the forming. Applicants' method permits high-quality belt pulleys to be manufactured from metal disks at a comparatively low amount of labor and cost involved in the working of the method. Applicants' method in a second operational step, rolls the wave-like profiled circumferential area (11) of the metal disk (1) to have a wave-like cross section with one wave maximum (12, 12') at each edge pointing radially toward the outside and a wave minimum (13, 13') laterally adjacent at the inside so that a wave-like contour is obtained with an optimum material distribution for further machining.

2 Claims, 2 Drawing Sheets

METHOD OF MANUFACTURING A BELT PULLEY

The invention relates to a method of manufacturing a belt pulley from a metal disk.

From German C 38 19 957 a method of the aforesaid kind is known. After the forming of a rim, the marginal area of a metal disk is flattened out in this method to form a hollow cylindrical body with flat surfaces at both the inside and the outside. In order to form a belt pulley, grooves are incorporated in this flat body which run in circumferential and transverse directions. Disadvantageously, this method includes the risk that during the flattening, the material distribution of the marginal area of the metal disk, provided with a rim, does not correspond to the desired material distribution of the respective final profile. This in turn can lead to inhomogeneities in the material caused by excessive rolling or overlappings. The strength and the service life of the belt pulley are thus substantially reduced. A similar problem occurs when the grooves are incorporated in the flattened marginal area since the material which must laterally escape during the formation of the grooves has hardly space enough to do so such that here excessive rolling can occur too.

A further method of manufacturing belt pulleys is known from U.S. Pat. No. 4,273,547. In this method a pot-like, deep drawn element is first formed from a metal disk by means of pressing.

The material is reinforced by an axial "collapsing", i.e. the circumferential areas are axially pressed together thus increasing the material strength. For this purpose the lower and the upper jaw of the die chuck are constantly moved toward each other. It is only subsequently, that the circumferential area is flattened or profiled for belt support. The method hence requires many operational steps to be carried out since many different procedures, like deep-pressing and -drawing, axial pressing, radial flattening and profiling are necessary.

It is hence an object of the invention to provide a method of the aforesaid kind that permits manufacturing high-quality belt pulleys from metal disks while the amount of labor and cost involved in the manufacture is comparatively small.

The object is accomplished in accordance with the invention.

Advantageously, the metal disk is machined in the new method such that the force input is kept at a minimum. Excessive rolling and overlappings during the forming and possibly during the final profiling are avoided due to the wave-like shape of the circumferential area that is produced in the course of the method and the subsequent continued forming that corresponds to the material distribution for the respective final product. The input and the machinery required for the technical realization of the method are kept at a minimum. The new method hence permits manufacturing a high-quality belt pulley at low cost.

The object is alternatively accomplished in that the final profile is rolled in the wave-like profile of the first operational step without additional intermediate steps. This method variant is particularly suitable for metal disks with a less thick material, and a particular advantage is the short period of time required for the machining due to the small number of operational steps.

Independent of the method variant, it is possible to advantageously carry out all operational steps as radial pressing procedures which reduces the technical complexity of the realization. Moreover, chucked once, the workpiece can be machined from the disk to the finished belt pulley while excessive rolling is practically excluded.

For a better understanding of the invention, together with other and further objects thereof, reference is made to the following description, taken in connection with the accompanying drawings, and its scope will be pointed out in the appended claims.

In accordance with the invention, a method of manufacturing a belt pulley from a metal disk, having a hub and an area that is provided with a profile which is basically hollow cylindrical and the thickness of the material of the profile is greater than the thickness of the hub, comprises in a first operational step giving the metal disk a wave-like profile in its circumferential area, and in a second operational step, rolling the wave-like profiled circumferential area of the metal disk to have a multiple wave-like cross section with one wave maximum at each edge pointing radially toward the outside and a wave minimum laterally adjacent the inside, so that a wave-like contour is obtained with a desired material distribution for further machining.

In a further improvement of the method, a prepressed metal disk is used. This increases the stability of the belt pulley in the vicinity of the hub and the forming following the prepressing can be prepared and facilitated.

Figure 2:
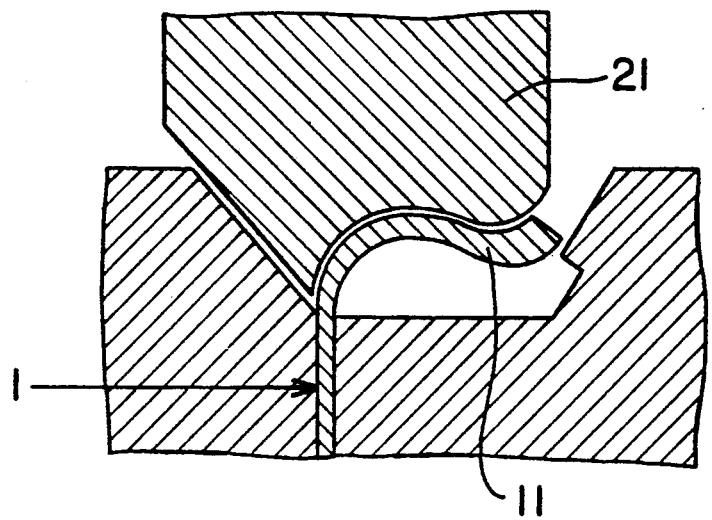
Figure 3:
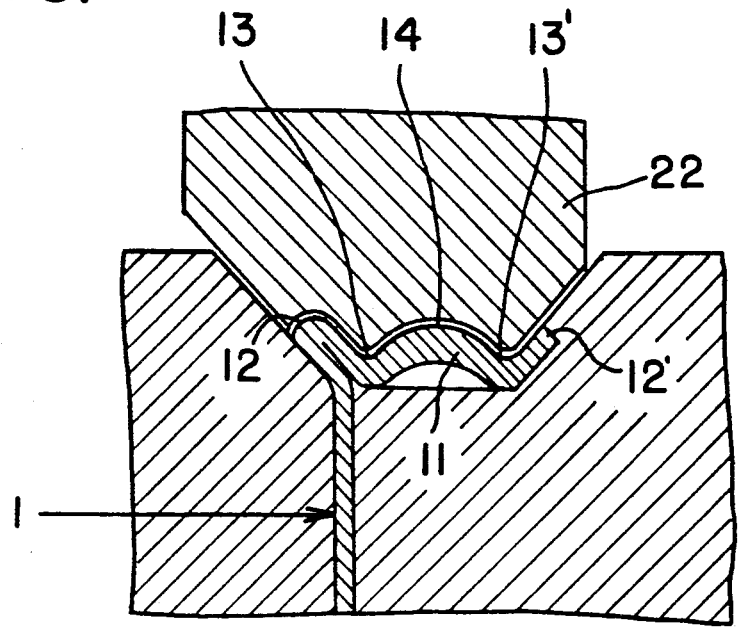
Figure 4:
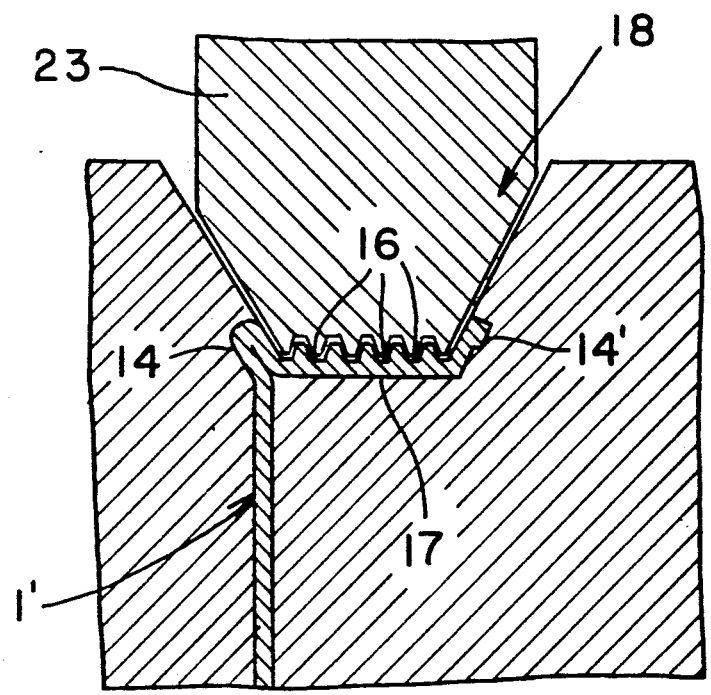

The following drawing explains the sequence of operational steps of the method in accordance with the invention. Referring now to the drawings:

FIG. 1 is a cross sectional view of a chucked, flat metal disk before the wave-like profiling with the forming roller, FIG. 2 is the disk of FIG. 1 after the wave-like profiling, FIG. 3 is the disk after the operational step for obtaining the optimum material distribution as a preform for the final profile to be applied, FIG. 4 is the disk after the final profiling into a multiple V-belt pulley.

FIGS. 1 to 4 show the operational sequence and are the same representation of the partial areas of a metal disk 1, a lower and upper jaw 20 and 20' of a chuck and rollers 21 to 23 for forming the metal disk 1. The metal disk 1 is clamped between the jaws 20 and 20' of the chuck which are pressed together. This unit is then turned around an axis perpendicular to the plane of the disk. The rollers 21 to 23 can be rotated around a parallel axis and can be moved in the plane of the drawing.

In FIG. 1, the external circumferential area 11 of the metal disk configured as a flat disk with central hub 10 has not yet been formed. A first forming of the circumferential area 11, a wave-like profiling, is carried out by the forming roller 21.

FIG. 2 shows the metal disk 1 at the end of the first forming method where the circumferential area 11 was bent to the inside and brought into a curved form and its thickness increases toward the external end.

In the next operational step, FIG. 3, the circumferential area 11 of the metal disk 1 is machined using roller 22. The result of this step is already shown in FIG. 3. The circumferential area 11 of the metal disk 1 has now a wave-like cross section with a wave maximum 12 and 12' at each rim radially pointing toward the outside and a wave minimum 13, 13', respectively, laterally adjacent toward the inside. In the example represented here, there is a further wave maximum 14 between the two wave minima 13 and 13'. It is of course possible to have more than one wave maximum 14 and a corresponding number of wave minima. This number essentially depends upon the desired width of the belt support of the belt pulley to be manufactured. The so obtained material distribution in the circumferential area of the metal disk is also an essential factor of the operational step. As it can be seen from FIG. 3, the material has its thickest dimension in the area of the central wave maximum 14 which becomes smaller as it approaches the lateral maxima 12 and 12'. The thickness of the material, however, is still greater than in the area of the hub 10 of the metal disk 1.

The last operational step of the method sequences explained here is the one of FIG. 4 where the pre-profiled circumferential area 11 of the metal disk 1 of FIG. 3 is provided with V-grooves 16 running in circumferential direction to provide a finished profile. In the present example, a roller 23 which functions as a final profiling roller serves to accomplish this. The previous circumferential area 11 is formed into the finished belt support 18 and in this final operational step the metal disk becomes a finished multiple-V-belt pulley 1'.

Alternatively, the step of rolling a finished profile in the wave-like profile produced in the first operational step as represented in FIG. 2 may be accomplished without the intermediate step as represented in FIG. 3.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Method of manufacturing from a metal disk a belt pulley having a hub and a circumferential area that is provided with a profile which is basically hollow cylindrical and the thickness of material of at least a major portion of the profile being greater than the thickness of the hub, comprising: in a single operational step giving the metal disk a wave-like profile in its circumferential area, and in a second operational step, rolling the wave-like profiled circumferential area of the metal disk to have a multiple wave-like cross section with one wave maximum at each edge pointing radially toward the outside and a wave minimum laterally adjacent at the inside, so that a multiple wave-like contour is obtained with a desired material distribution for further machining.

2. Method of manufacturing from a metal disk a belt pulley having a hub and a circumferential area that is provided with a profile which is basically hollow cylindrical and the thickness of material of at least a major portion of the profile being greater than the thickness of the hub, comprising: in a single operational step giving the metal disk a wave-like profile in its circumferential area, and in another step rolling a finished profile in the wave-like profile produced in the first operational step.

* * * * *